United States Patent [19]
Keegan

[11] 4,085,296
[45] Apr. 18, 1978

[54] MODULATED SOUND READING SYSTEM

[75] Inventor: Pat Keegan, Van Nuys, Calif.

[73] Assignee: International Audio Visual, Inc., Van Nuys, Calif.

[21] Appl. No.: 642,308

[22] Filed: Dec. 19, 1975

[51] Int. Cl.² .............................................. G11B 7/00
[52] U.S. Cl. ...................... 179/100.3 R; 179/100.3 Z; 179/100.31; 179/100.3 GN; 250/552; 352/27
[58] Field of Search .................... 179/100.3 Z, 100.31, 179/100.3 GN, 100.3 N, 100.3 R, 100.3 C, 100.3 E, 100.3 F, 100.4 A, 100.41 L; 250/552, 226; 352/27

[56] References Cited

U.S. PATENT DOCUMENTS

| Re. 27,930 | 2/1974 | House | 250/216 |
|---|---|---|---|
| 2,082,846 | 6/1937 | Otis | 179/100.3 Z |
| 2,497,952 | 2/1950 | Maurer | 179/100.31 |
| 2,664,470 | 12/1953 | Gillette | 179/100.31 |
| 3,396,344 | 8/1968 | Broom | 179/100.3 Z |
| 3,619,516 | 11/1971 | Miller | 179/100.3 Z |
| 3,941,945 | 3/1976 | Borner | 179/100.3 Z |

OTHER PUBLICATIONS

"Film Scan System Using a Semiconductor Light Source and Light Detector" by Spitzak; Feb., 1966 Journal of the SMPTE; vol. 75, pp. 103-105.
The Radio Amateur's Handbook; 1971; pp. 94-96, 131-134.

Primary Examiner—Bernard Konick
Assistant Examiner—Alan Faber
Attorney, Agent, or Firm—John J. Posta, Jr.

[57] ABSTRACT

A motion picture sound reading system employing a light emitting diode source which is modulated at a carrier frequency several times higher than the highest sound-track frequency for exciting the optical sound track and a carrier-demodulation signal processing system for deriving a high-quality audio signal from the photoelectrically detected optical sound track.

9 Claims, 2 Drawing Figures

MODULATED SOUND READING SYSTEM

BACKGROUND OF THE INVENTION

Heretofore, sound motion pictures have employed three principal types of sound tracks; namely, variable density optical tracks, variable area optical tracks, and magnetically-recorded tracks. The present invention is related to the first two types; namely, optical sound tracks which are intended to be synchronously "read" in conjunction with the projection of the related image frames on the film in a conventional and well-known manner.

Heretofore, motion picture projectors intended for use with sound motion picture film of the type having optical sound tracks, whether of the variable area type or the variable density type, have employed a continuously energized "exciter" lamp which illuminated the sound track on the film with a narrow beam having a uniform light flux. This beam was of roughly rectangular shape, having a transverse dimension coextensive with the width of the sound track, and a height which was less than the equivalent wavelength of the highest audio frequency to be reproduced. This beam was focused onto a photoelectric cell located on the side of the sound track opposite the exciter lamp.

In practice, the exciter lamp was energized with direct current so as to provide a steady light flux. Variations in the optical transmission of the sound track, in consonance with the recorded audio signal, modulated the light flux falling on the photocell, thereby generating an audio output signal. A very narrow slit in the light path from the exciter lamp constrained the light to a beam of proper dimension for illuminating or "exciting" the moving sound track on the film. This structure and its appurtenances are collectively called the "light gate" and with the addition of the exciter lamp and photocell are collectively known as the "sound reading head".

While sound heads of the prior art have been commercially satisfactory, they have suffered from such shortcomings as the requirements for scrupulous cleanliness, constant maintenance, and less than optimal signal-to-noise ratio. Furthermore, sound heads of the prior art require a high degree of shielding from extraneous ambient light, lest such light degrade the desired output audio signal.

Other limitations of prior art sound reading heads are that they utilize incandescent lamps whose filaments are subject to mechanical vibration of the filament; also they are subject to variations in the power supply, and they have a relatively short operational life. These and other shortcomings of prior art devices are overcome by the novel and improved apparatus and method of the present invention.

BRIEF SUMMARY OF THE INVENTION

The present invention comprises a novel and improved sound head or sound reader for reproducing the audio signal from standard optical tracks of the type employed in sound motion pictures. More particularly the invention comprises one or more solid-state light-emitting diodes which illuminate the sound track on the motion picture film. The power supply for energizing the diode(s) is modulated at 200 kilohertz (kHz) or some other suitable carrier frequency. The output from the photoelectric detector located on the side of the sound track opposite the light emitting diode, generates a signal corresponding to the 200 kHz carrier plus the modulation envelop of the audio signal derived from the sound track on the film.

A demodulator tuned to 200 kHz extracts the audio signal from the modulated carrier, and the subsequent signal amplification is essentially the same as in conventional motion picture sound reproduction systems. However, by reason of the 200 kHz modulated carrier, the effects of undesired or extraneous light are filtered out of the system.

Furthermore, the system is essentially free from the vagaries of variations in the exciter power supply and of mechanical vibration of the exciter light source. Also, the solid-state light source has an exceptionally long useful life and is relatively cool in its operation. All of the benefits of modulated-carrier signal processing, especially with respect to improved signal-to-noise ratio are effectively realized in the present invention.

Additionally, the apparatus of the invention is more compact, simpler in construction, more trouble free, and more efficient with respect to energy utilization than is apparatus of the prior art which is based on the use of incandescent exciter lamps.

It is therefore an object of the invention to provide a novel and improved sound reader head for motion picture projectors which utilizes a modulated-carrier signal processing system and method.

Another object of the invention is to provide a novel and improved sound reader which employs a light emitting diode which is modulated at a super-audible frequency.

Yet another object of the invention is to provide a novel and improved sound head for motion picture projection apparatus which uses modulated light-emitting diodes as the sound track excitation source, and utilizes carrier demodulation apparatus for recovering the sound (audio) signal recorded on the motion picture film.

These and other objects and improvements of the invention will become more apparent from consideration of the following specification and drawings in which:

BRIEF DESCRIPTION OF A PREFERRED EMBODIMENT OF THE INVENTION

Figure 1:
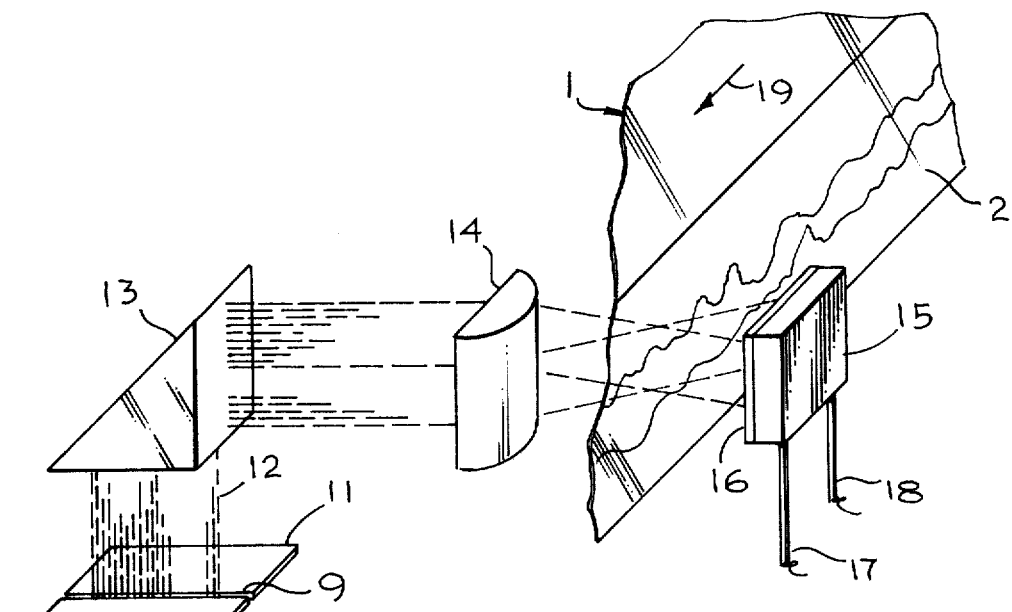
FIG. 1 is a simplified diagrammatic illustration of the sound reader portion of the apparatus of the invention.

Referring to FIG. 1 there is shown a portion of a conventional sound-on-film release print 1 having an optical sound track 2 along one edge thereof. The sound track 2 may be of either the variable area or the variable density type, as will be well known to those versed in the art. Excitation of the sound track is provided by a pair of light-emitting diodes (LED) 3 and 4 suitably mounted in side-by-side relationship. Leads 5-8 are connected to a suitable power supply for energization of LEDs 3 and 4, as will be further explained in connection with the description of FIG. 2.

The light output of LEDs 3 and 4 is monochromatic and typically may comprise light in the red portion of the visible spectrum. The light output is directed through an elongate slit 9, nominally 0.0008 inches wide and at least as long as the width of the sound track 2, which is formed in aperture plate 11. This arrangement confines the light emanating from LEDs 3 and 4 to a narrow ribbon-like path 12. A right-angle prism 13 redirects the light path 12 towards the sound track 2. Cylindrical lens 14 is interposed in the light path between prism 13 and the sound track 2, and functions to merge the individual beams of light from the respective LEDs 3 and 4 into a continuous narrow beam which is focused onto the sound track 2.

Light from lens 14 passes through the transparent portion of the sound track 2 thence onto photodetector 15, where it is converted to an electrical signal. Photodetector 15 may comprise a phototransistor, solar cell, or other photoelectric transducer which is responsive to light in the same portion of the spectrum as that emitted by LEDs 3 and 4.

The light response of photodetector 15 may be peaked to correspond to the monochromatic light from LEDs 3 and 4, or an optical band-pass filter 16 may be placed in front of photodetector 15 to exclude essentially all light except that corresponding to the output from LEDs 3 and 4. In this way, the system is relatively immune to spurious ambient light, since only monochromatic light of a particular given wavelength will be sensed by the photodetector 15.

The electrical output signal appearing on leads 17 and 18 comprises the audio signal derived from the sound track 2 as it moves through the apparatus in the direction of arrow 19.

Figure 2:
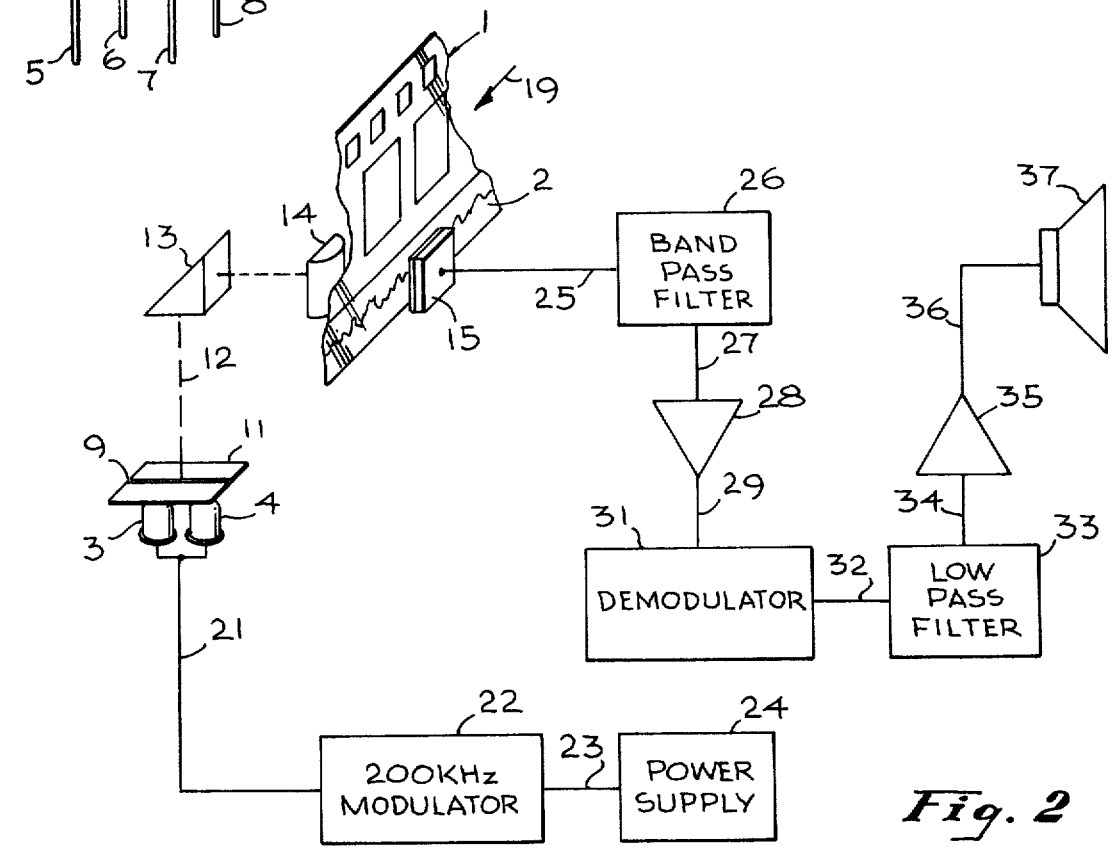
FIG. 2 is a block diagram of a motion-picture sound playback system constructed in accordance with the invention.

Referring to FIG. 2, there is shown a block diagram of the overall sound reader apparatus of the invention, incorporating the structure of FIG. 1. Light emitting diodes 3 and 4 are energized via line 21 which in turn is connected to modulator 22. The function of modulator 22, which may be of any suitable and well-known construction, is to supply a carrier output signal of, for example, 200 kHz for driving the LEDs 3 and 4.

Suitable operating potential is supplied to modulator 22 via line 23 from power supply 24. The output power from modulator 22 should preferably be at least five times the highest frequency of the highest audio signal that is to be reproduced from the sound track 2. Hence an exemplary carrier frequency of 200 kHz is more than adequate and could satisfactorily be as low as 80 kHz for high-quality sound reproduction.

It is not, however, essential that the carrier frequency be as high as five times the highest audio signal frequency, but merely that it be higher than the highest frequency to be transduced. The wave form of the excitation carrier on line 21 also is not critical, but preferably may be a square wave train of uniform frequency.

Modulation of the light passing through the sound track 2 results in an amplitude-modulated 200 kHz carrier signal appearing on line 25 from photodetector 15. This signal on line 25 is sent through a band-pass filter which has a pass-band tuned to 200 kHz, thereby rejecting any spurious signals or noise which may have entered the system up to this point. The output from filter 26 is supplied to pre-amplifier 28 via line 27, and thence via line 29 to demodulator 31.

The function of demodulator 31 is to extract the audio signal from the modulated 200 kHz carrier signal, and may comprise a detector of any suitable and well-known construction.

The audio signal on line 32 from demodulator 31 may optionally pass through a low-pass filter 33 having its upper frequency pass limit at the upper end of the desired audio frequency spectrum, in order to further reject spurious signals and noise from the system output. The audio signal on line 34 from filter 33 is supplied to power amplifier 34 of any suitable and well-known construction where it is amplified to a level suitable for driving a loudspeaker of other desired output transducer. The amplified audio output on line 36 from amplifier 35 drives loudspeaker 37, as will be readily understood by those versed in the art.

From the foregoing it will be seen that the novel and improved apparatus of the invention utilizes both optical filtering, via monochromatic light, and electrical filtering, via a modulated carrier system for system noise rejection and enhancement of the signal-to-noise ratio. Additionally, the system is relatively immune to mechanically induced noise, such as that produced by vibration of the filament of the incandescent lamp of prior sound heads. Also, the apparatus of the present invention has substantially greater service life than prior sound heads utilizing incandescent exciter lamps.

Certain modifications may be made by those versed in the art without departing from the intended scope of the invention. For example, in the preferred embodiment described, the light source comprised a pair of light-emitting diodes. In practice either a single LED or a plurality of LEDs greater than two may be used. Inasmuch as conventional LEDs may function to produce light from either an essentially point source or a given area source, the particular light output pattern and light flux determines the number of LEDs most suitable for a given sound head. A row of point-source LEDs will function well in a practical construction of the invention by reason of the cylindrical lens 14 which merges their individual outputs into an essentially continuous line of light for scanning the sound track.

Other modifications, such as varying the carrier frequency from the suggested 200 kHz may also be made by those versed in the art.

What is claimed is:

1. A sound reading system for transducing the optical sound track from sound-on-film motion picture film, comprising:

monochromatic light emitting diode means for excitation of said sound track;

means for modulating the light output from said light emitting diode means at a fixed carrier frequency that is higher than the highest audio frequency to be read from said sound track;

photodetector means responsive to the monochromatic light from said excited sound track for producing an electrical carrier output signal which is amplitude modulated in conformance with the optical transmission characteristic of said sound track; and means for demodulating the amplitude-modulated carrier signal output from said photoselector means to provides an audio output signal.

2. A sound reading system as defined in claim 1 including:

optical filter means having a transmission band substantially corresponding to the wavelength of the monochrome output of said light emitting diode means, said filter means being interposed in the light input path of said photodetector means whereby substantially all wavelengths of light other than said monochromatic light are rejected from entering said photodetector means.

3. A sound reading system as defined in claim 1 including:

means for confirming the light emitted from said light emitting diode means to a path having a cross-sectional height of approximately 0.0008 inches and a width approximately equal to or greater than the width of said optical sound tracks.

4. A sound reading system as defined in claim 3 wherein said confining means comprises:
an aperture plate interposed in the light output path of said light emitting diode means, and having an elongate aperture therein; and,
a cylindrical lens interposed in the light path between said aperture plate and said optical sound track, and having its major axis aligned with the transverse axis of said optical sound track.

5. A sound reading system as defined in claim 1 wherein said means for modulating comprises:
a square-wave generator for supplying a train of pulses to said light emitting diode means, the frequency of said pulses being substantially higher than the upper frequency limit of the audio-frequency spectrum.

6. A sound reading system as defined in claim 1 including:
a band-pass filter interposed in the signal path between said photodetector means and said carrier demodulating means, said band-pass filter having a passband whose center frequency is substantially the same as the fixed carrier frequency of said modulation means.

7. A sound reading system as defined in claim 1 wherein said light emitting diode means comprises:
a plurality of monochromatic light emitting diodes of common output wavelength disposed in side-by-side relationship and driven in common from said modulating means.

8. A sound reading system as defined in claim 1 including:
a low-pass audio signal filter interposed between the output of said demodulating means and the output of said system, the upper frequency limit of said low-pass filter corresponding to the upper frequency limit of the audio signals on said sound track.

9. A sound reading system as defined in claim 1 wherein said photodetector means comprises:
a solid-state photovoltaic transducer having its optimal light sensitivity at the wavelength corresponding to the wavelength of the output of said monochromatic light emitting diode means.

* * * * *